E. W. HUMBERT.
FOCUSING CLOTH.
APPLICATION FILED JUNE 7, 1917.

1,264,801.

Patented Apr. 30, 1918.

WITNESSES
Frank C. Palmer.

INVENTOR
E. W. Humbert
BY
ATTORNEYS

UNITED STATES PATENT OFFICE.

EDWARD W. HUMBERT, OF UNIONTOWN, PENNSYLVANIA.

FOCUSING-CLOTH.

1,264,801.  Specification of Letters Patent.  Patented Apr. 30, 1918.

Application filed June 7, 1917. Serial No. 173,349.

*To all whom it may concern:*

Be it known that I, EDWARD W. HUMBERT, a citizen of the United States, and a resident of Uniontown, in the county of Fayette and State of Pennsylvania, have invented a new and Improved Focusing-Cloth, of which the following is a full, clear, and exact description.

My invention relates to a focusing cloth which can be easily and quickly secured to a camera so that the cloth will not interfere with the handling and operation of the camera while focusing, loading or unloading the camera.

Another object of the invention is to provide a focusing cloth which will serve as a protector to the camera while the same is in operative position.

A further object of the invention is to provide a cloth which can be used without difficulty or inconvenience in windy weather.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
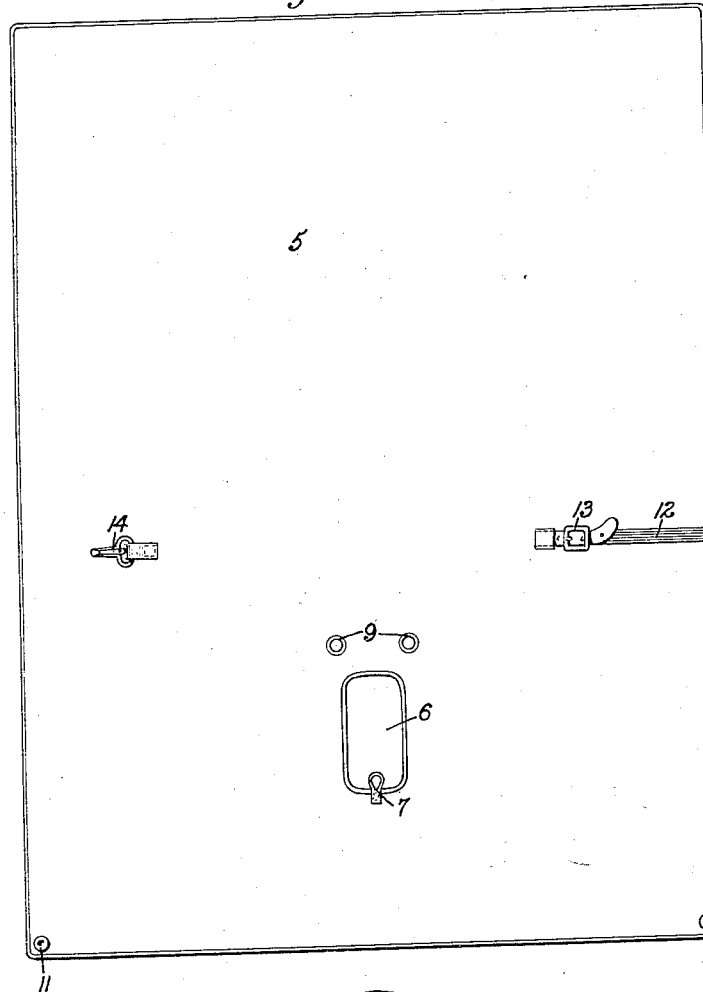
Figure 1 is a plan of my outstretched cloth.

Referring to the drawings, 5 is a cloth of a character such as is used commonly for focusing purposes. It is preferably of rectangular configuration and provided with an opening 6 near one end, substantially in the central longitudinal axis of the cloth. The opening 6 is large enough to easily fit over shutter of camera and preferably of elongated form, to allow vertical shifting of shutter (see Fig. 2). A loop 7 is secured to the cloth near the lower edge of the aperture 6. This loop is shown engaging with the clamping screw 8 of the camera front, but may connect with some other convenient fixture or attachment thereabout.

The cloth has also a pair of apertures 9 above the opening 6 through which the knobs on the standards of the camera may protrude. Connection to camera by loop and apertures is all that is ordinarily necessary to easily secure high efficiency from use of cloth, but to prevent the front corners from flapping about unduly in windy weather they are provided with fastening means 11, such, for example, as glove fasteners, whereby the two corners may be united.

To prevent the wind from raising the rear part of the cloth, an elastic strap 12 is provided substantially in the middle of the cloth near one of the longitudinal edges. The strap may be adjusted on the cloth by means of a buckle arrangement 13. Near the other longitudinal edge of the cloth a hook 14 is provided to which the loop 15 of the strap may be secured. This strap is adapted to pass under the head of the tripod and thereby firmly secure the cloth to and about the camera.

When cloth is thrown over camera and secured at the front, the weight of that part overhanging rear of camera naturally draws on mid-portion and prevents it from resting on bellows and sagging them so as to cut off a portion of view. Furthermore, the covering of the bellows by the cloth serves as a protector for the bellows when the atmospheric conditions are not favorable, particularly when it is raining or very humid.

Figure 3:
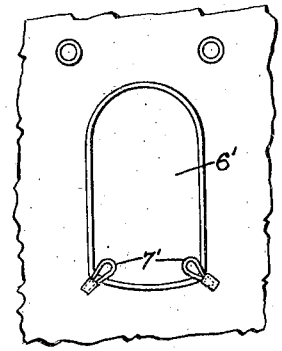
Fig. 3 is a fragmentary elevation of the cloth at the opening for the lens, the opening and the means for securing the cloth at the lens being modified in structure from that shown in Fig. 1.
Figure 4:
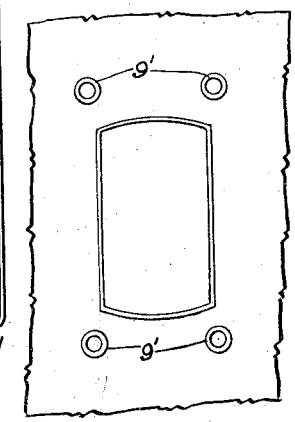
Fig. 4 is a view similar to that of Fig. 3, showing a further modified structure.
Figure 2:
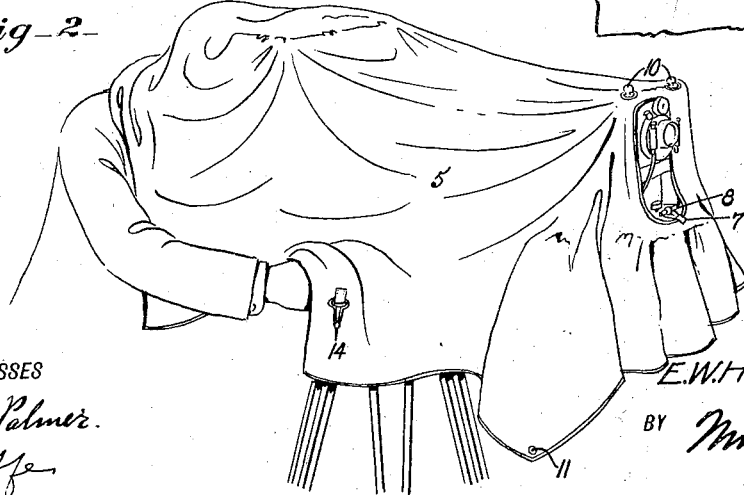
Fig. 2 is a perspective view of a camera covered with a focusing cloth embodying my invention.

In lieu of providing a single loop, as shown in Figs. 1 and 2, a pair of loops may be provided near the corners at the lower edge of the opening (see Fig. 3). In the structure shown in that figure, the opening 6' is preferably shown rounded at the upper end; and near the lower edge of the opening 6' loops 7' are provided, each near the corner of the opening. In Fig. 4, in lieu of providing loops, apertures 9' are provided below the lower edge similar to the apertures 9' at the upper edge, for which apertures there are knobs on the camera.

From the above description it will be seen that wind cannot separate the cover from the camera nor shift it so it will hang over the lens. After being attached to camera it will remain in place without attention until removed by the operator. Any constricting or lifting of rear portion necessary during focusing, loading and unloading is easily done with one hand. The front part of the cloth is fixed or secured, and therefore, it is only necessary to operate the rear part to obtain the desired effect. In consequence, the other hand is free for any operation of the camera.

I claim:

1. A focusing cloth of rectangular shape having an elongated aperture through which a lens of a camera is adapted to project, means at the opening for securing the cloth to the camera and securing means in the middle part of the cloth for securing the cloth to the camera.

2. A focusing cloth having an elongated opening through which a lens of a camera is adapted to project, and means near the lower end of the opening for securing the cloth to a camera, said cloth having means near the upper end of the opening for engaging the camera.

3. A focusing cloth having an elongated opening through which a lens of a camera is adapted to project, said cloth having apertures above the opening, and a loop at the lower end of the opening.

4. A focusing cloth having an elongated opening nearer to one end and substantially in the central longitudinal axis of the same, said cloth having apertures to one end of said opening, a loop near the other end of the opening, fastening means associated with the corners of the cloth nearest to the opening, whereby the two corners may be secured, and elastic fastening means associated with the middle part of the cloth substantially as and for the purpose set forth.

EDWARD W. HUMBERT.